United States Patent
Lv et al.

(10) Patent No.: US 10,741,326 B2
(45) Date of Patent: Aug. 11, 2020

(54) METHOD FOR IMPROVEMENT OF MAGNETIC PERFORMANCE OF SINTERED NDFEB LAMELLAR MAGNET

(71) Applicants: NINGBO YUNSHENG CO., LTD., Zhejiang (CN); NINGBO YUNSHENG MAGNET DEVICES TECHNOLOGY CO., LTD., Zhejiang (CN)

(72) Inventors: Xiangke Lv, Zhejiang (CN); Chunguo Wang, Zhejiang (CN); Min Zhang, Zhejiang (CN); Yong Ding, Zhejiang (CN); Qingzhong Yang, Zhejiang (CN); Yiqun Hu, Zhejiang (CN); Jiangfeng Wang, Zhejiang (CN)

(73) Assignees: NINGBO YUNSHENG CO., LTD., Zhejiang (CN); NINGBO YUNSHENG MAGNET DEVICES TECHNOLOGY CO., LTD., Zhejiang (CN)

( * ) Notice: Subject to any disclaimer, the term of this patent is extended or adjusted under 35 U.S.C. 154(b) by 241 days.

(21) Appl. No.: 15/742,531

(22) PCT Filed: Jul. 12, 2016

(86) PCT No.: PCT/CN2016/000378
§ 371 (c)(1),
(2) Date: Jan. 8, 2018

(87) PCT Pub. No.: WO2017/107248
PCT Pub. Date: Jun. 29, 2017

(65) Prior Publication Data
US 2018/0218834 A1 Aug. 2, 2018

(30) Foreign Application Priority Data

Dec. 25, 2015 (CN) .......................... 2015 1 0995271

(51) Int. Cl.
*H01F 41/02* (2006.01)
*H01F 1/057* (2006.01)
*C23C 12/02* (2006.01)
*C21D 3/06* (2006.01)

(52) U.S. Cl.
CPC ......... *H01F 41/0293* (2013.01); *C23C 12/02* (2013.01); *H01F 1/057* (2013.01); *C21D 3/06* (2013.01); *H01F 1/0577* (2013.01); *Y02P 10/212* (2015.11)

(58) Field of Classification Search
CPC ............................ H01F 41/0293; C23C 12/02
USPC ........................................................ 148/102
See application file for complete search history.

(56) References Cited

U.S. PATENT DOCUMENTS

| 8,231,740 B2 * | 7/2012 | Nakamura | H01F 41/0293 148/101 |
| 2010/0129538 A1 * | 5/2010 | Kunieda | C22C 33/0278 427/127 |
| 2011/0240909 A1 * | 10/2011 | Kanda | H01F 1/0555 252/62.55 |

FOREIGN PATENT DOCUMENTS

| CN | 101615459 | 12/2009 |
| CN | 101908397 | 12/2010 |
| CN | 102747318 | 10/2012 |
| CN | 101563739 | 3/2013 |
| CN | 101542654 | 1/2015 |
| CN | 105489367 | 4/2016 |
| JP | 2014017480 | 1/2014 |

OTHER PUBLICATIONS

"International Search Report (Form PCT/ISA/210)", dated Sep. 5, 2016, with English translation thereof, pp. 1-4.

* cited by examiner

*Primary Examiner* — Anthony J Zimmer
*Assistant Examiner* — Ricardo D Morales
(74) *Attorney, Agent, or Firm* — JCIPRNET

(57) ABSTRACT

A method for improvement of magnetic performance of sintered NdFeB magnet includes the following steps. Firstly, material containing element R, H and X is to be covered on a surface of the sintered NdFeB magnet to form a finish coat. After that, proceed with a diffusion treatment and an aging treatment to the sintered NdFeB magnet with the finish coat in the environment of vacuum or inert gas. R is at least one of such elements as Sc, Y, La, Ce, Pr, Nd, Pm, Sm, Eu, Gd, Tb, Dy, Ho, Er, Tm, Yb and Lu. H is hydrogen. X is at least one of such elements as C, O, N, S, B, Cl and Si.

9 Claims, No Drawings

METHOD FOR IMPROVEMENT OF MAGNETIC PERFORMANCE OF SINTERED NDFEB LAMELLAR MAGNET

CROSS-REFERENCE TO RELATED APPLICATION

This application is a 371 application of International PCT application serial no. PCT/CN2016/000378, filed on Jul. 12, 2016, which claims the priority benefit of Chinese application no. 201510995271.X, filed on Dec. 25, 2015. The entirety of each of the abovementioned patent applications is hereby incorporated by reference herein and made a part of this specification.

BACKGROUND OF THE INVENTION

1. Field of the Invention

The present invention generally relates to a sintered NdFeB magnet processing technology, in particular, to a method for improvement of magnetic performance of sintered NdFeB magnet.

2. Description of Related Art

Sintered NdFeB permanent magnetic material has been extensively applied in aeronautic, astronautic, military and civil sectors owing to its excellent magnetic performance. In recent years, such energy saving products as energy saving elevator, VF air conditioner, hybrid electric vehicle and electric vehicle have emerged in response to energy conservation and environmental protection as advocated by the State. Such products have brought forth high market demands for NdFeB products.

Performance of sintered NdFeB permanent magnetic material has been significantly improved through development for nearly 30 years; as experimental value of 1.555 T of remanence Br has reached 97% of the theoretical value 1.6 T, it is very difficult to further improve remanence of sintered NdFeB permanent magnetic material; on the contrary, experimental coercivity value of 0.82 T is only equivalent to 12% of the theoretical value of 6.7 T, there is still room for improvement. Therefore, exploration of approaches for maintenance of high remanence and improvement of coercivity has become a difficult as well as hot point of study nowadays. According to study, it is applicable to improve coercivity of the magnet by using such heavy rare earth elements as Dy/Tb to substitute partial Nd in the magnet to generate new phase $(Nd,Dy/Tb)_2Fe_{14}B$ with anisotropy field exceeding that of the main phase; however, this may result in significant reduction in remanence of the magnet; meanwhile, high-coercivity magnet prepared with traditional processes requires high content of heavy rare earth elements and high production cost. Grain boundary diffusion technology is a method as developed in recent years for preparation of high-coercivity magnet; The method for addition of heavy rare earth elements into the magnet with grain boundary diffusion technology aims to use heat treatment process to ensure diffusion of heavy rare earth elements as contained in the finish coat of the magnet into the magnet along the grain boundary of the magnet so as to make heavy rare earth elements distribute at the grain boundary phase and on the epitaxial layer of main phase; this can improve the coercivity while maintaining the remanence, which features in limited use of heavy rare earth elements and low cost.

Finish coat of sintered NdFeB magnet as prepared with grain boundary diffusion technology is normally formed by covering such powder at micrometer and nanometer scale as elementary rare earth, rare earth oxide, rare earth fluoride or rare earth hydride on the surface of sintered NdFeB magnet. Elementary rare earth has poor oxidation resistance, which makes it difficult for production. Rare earth oxide and rare earth fluoride is unlikely to produce elementary rare earth during diffusion despite of its high oxidation resistance; on the other hand, oxygen and fluorine atoms as contained in the rare earth oxide and rare earth fluoride may incur damages to the performance of magnet to some extent. As compared with elementary rare earth, rare earth hydride has higher oxidation resistance, which can generate elementary metal and hydrogen gas through dehydrogenation at certain temperature; therefore, it is an ideal compound for grain boundary diffusion.

Presently, there are three methods for improvement of coercivity of sintered NdFeB magnet by using the heavy rare earth hydride as the coating material based on grain boundary diffusion technology. The first method is the evaporation-condensation method as disclosed in Chinese Patent numbered CN201010241737.4 for obtainment of heavy rare earth hydride with grain size of 10-100 nm; this method aims to cover heavy rare earth hydride powder on the surface of magnet to make heavy rare earth elements come into the magnet through heat treatment. The second method is the method as disclosed by Chinese Patent numbered CN201210177327.7 and CN200880000267.3 for obtainment of heavy rare earth hydride powder through hydrogen absorption and fragmentation, which aims to coat heavy rare earth hydride powder on the magnet surface, and make heavy rare earth elements come into the magnet through heat treatment. The third method is the method as disclosed by Chinese Patent numbered CN200780047391.0 for evaporation by using $DyH_2$ or $TbH_2$ to make the heavy rare earth elements come into the magnet through heat treatment.

According to aforesaid three methods, heavy rare earth hydride powder at micrometer or nanometer scale as used by the first and second methods has extremely high activity, which is apt to incur oxygen combustion and even explosion; it is unlikely to satisfy requirements for protection of powder during mass production; furthermore, once the powder is oxidized, coercivity of sintered NdFeB magnet will witness a significant reduction to the extent of resulting in poor consistency to products and extremely serious potential safety hazards; moreover, heavy rare earth hydride powder at micrometer or nanometer scale is difficult for recycling due to its vulnerability to oxidation, which has such disadvantages as low utilization rate of heavy rare earth elements and high production cost. Despite of the fact that the third method has higher safety, rare earth hydride may be in random distribution inside the equipment during evaporation, which is unlikely to adhere to the surface of sintered NdFeB magnet; therefore, utilization rate of heavy rare earth elements is extremely low; furthermore, expensive evaporation equipment and low evaporation efficiency may also result in increased production cost.

SUMMARY OF THE INVENTION

The technical issue to be solved by the present invention is to provide a method for improvement of performance of sintered NdFeB magnet; such method is to be available for mass product, which shall have such features as high efficiency, excellent consistency of products, high utilization rate of heavy rare earth elements, low production cost and high safety.

Technical solution used by the present invention to solve aforesaid technical issue is stated as follows: A method for improvement of magnetic performance of sintered NdFeB magnet: Firstly, material containing element R, H and X is to be covered on the surface of the sintered NdFeB magnet to form a finish coat; after that, proceed with diffusion and aging treatment to the sintered NdFeB magnet with finish coat in the environment of vacuum or inert gas; wherein, R is at least one of such elements as Sc, Y, La, Ce, Pr, Nd, Pm, Sm, Eu, Gd, Tb, Dy, Ho, Er, Tm, Yb and Lu; H is hydrogen; X is at least one of such elements as C, O, N, S, B, Cl and Si.

In the material containing element R, H and X, content of the element H in terms of mass percentage is 0.01%-2%. According to this method, it is applicable to improve the stability of the material by controlling content of element H within the range of 0.01-2%.

In the material containing element R, H and X, content of the element X in terms of mass percentage is 0.01%-10%. According to this method, it is applicable to improve the stability of the material by controlling content of element X in the material within the range of 0.01%-10%; meanwhile, performance of the sintered NdFeB magnet obtained by using this method can be significantly improved.

The material containing element R, H and X also contains other elements that can form alloy or inter-metallic compound through chemical reaction with the element R. The element R, H and X in the material exists as the product by chemical reaction of the mixture of the element R, H and X. According to this method, rare earth element R is in reaction with rare earth element H and X simultaneously to generate the compound containing element R, H and X; the material prepared by using such compound can provide the finish coat with higher stability.

The element R, H and X in the material exists as the product by chemical reaction of the mixture of the element R, H and X. According to this method, element X can effectively improve stability of rare earth hydride, which is favorable for mass production, improvement of product consistency and recycling of material.

The element R is at least one of such elements as Pr, Nd, Gd, Dy, Tb and Ho. This method can significantly improve the coercivity of the magnet.

Thickness of the sintered NdFeB magnet is below 15 mm. According to this method, rare earth elements are in uniform diffusion in the magnet, of which coercivity has been significantly improved; furthermore, demagnetization curve is also provided with excellent squareness.

The sintered NdFeB magnet with finish coat shall subject to dehydrogenation treatment prior to diffusion treatment; the dehydrogenation temperature is 200° C.-900° C. and the holding time is 0.1 h-30 h. According to this method, it is applicable to effectively control the hydrogen content in the finish coat through dehydrogenation so as to prevent damages to magnet performance by high hydrogen content during follow-up diffusion treatment.

Mass percentage content of hydrogen in the finish coat will be below 0.2% after dehydrogenation of the sintered NdFeB magnet with finish coat. Such method can effectively control the hydrogen content in the finish coat to prevent damages to the magnet performance by hydrogen during follow-up diffusion treatment, and ensure the optimal magnet performance.

The diffusion treatment refers to heat preservation at the temperature of 700° C.-1000° C. for 1 h-30 h. This method aims to ensure effective diffusion of rare earth elements in the sintered NdFeB magnet for distribution at the grain boundary of the sintered NdFeB magnet and on the grain epitaxial layer of the main phase; it can significantly improve the coercivity while maintaining the remanence.

The aging treatment refers to heat preservation at the temperature of 400° C.-600° C. for 1 h-10 h.

As compared with prior arts, the present invention is characterized in that the material containing element R, H and X is covered on the surface of sintered NdFeB magnet to form a finish coat; R is at least one of 17 rare earth elements; H is hydrogen; X is at least one of such elements as C, O, N, S, B, Cl and Si; the material containing element R, H and X for formation of the finish coat has lower activity due to mutual action among element R, H and X, which is unlikely to be oxidized when exposed to the air; therefore, it will not incur problem with product consistency due to oxidization of the material, which can ensure excellent product consistency and higher safety; it is also available for mass production; meanwhile, the material containing element R, H and X is available for recycling and reuse owing to its high stability; for this reason, it can improve utilization rate of rare earth elements, and save production cost.

DESCRIPTION OF THE EMBODIMENTS

The present invention is further described in detail as follows in combination with embodiments:

Embodiment 1

A method for improvement of magnetic performance of sintered NdFeB magnet includes the following steps:

① Process the terbium metal in the hydrogen-oxygen mixed gas with oxygen content of 1% to obtain the coarse powder with hydrogen and oxygen content up to 9416 ppm and 3174 ppm respectively;

② Proceed with ball milling of coarse powder for 8 h to obtain the powder material with average particle size per specific area up to 1.51 μm;

③ Uniformly mix aforesaid powder material with ethanol absolute, and evenly spray it on the surface of sintered NdFeB magnet to form a 20 μm finish coat prior to drying at the temperature of 80° C.;

④ Proceed with dehydrogenation and diffusion treatment to the sintered NdFeB magnet as dried in proper sequence in the vacuum environment with pressure up to $6.0 \times 10^{-4}$ Pa prior to aging treatment; dehydrogenation temperature is 700° C.; dehydrogenation time is 0.5 h; diffusion treatment temperature is 900° C.; diffusion treatment time is 16 h; aging treatment temperature is 490° C.; aging treatment time is 4 h.

In this embodiment, sintered NdFeB magnet is made from massive sintered NdFeB magnet through mechanical processing (cutting); its specification (diameter×height) is Φ10×7 mm; massive sintered NdFeB magnet is prepared based on such well-established processes as strip casting, hydrogen decrepitation, jet milling, pressing and sintering in the field of NdFeB fabrication; sintered NdFeB magnet includes the following constituents: 29.5 wt. % Nd, 0.2 wt. % Dy, 1.0 wt. % B, residual Fe and other micro elements.

Embodiment 2

A method for improvement of magnetic performance of sintered NdFeB magnet includes the following steps:

① Process the dysprosium in the hydrogen gas to obtain the 1st coarse powder;

② Put the 1st coarse powder in the nitrogen-oxygen mixed gas with oxygen content up to 1.5% for deactivation for 24 h to obtain the 2nd coarse powder with hydrogen, oxygen and nitrogen content up to 9281 ppm, 3430 ppm and 2161 ppm respectively;

③ Proceed with ball milling of the 2nd coarse powder for 8 h to obtain the powder material with average particle size per specific area up to 1.45 μm;

④ Uniformly mix aforesaid powder material with ethanol absolute, and evenly spray it on the surface of sintered NdFeB magnet to form a 20 μm finish coat prior to drying at the temperature of 80° C.;

⑤ Proceed with dehydrogenation and diffusion treatment to the sintered NdFeB magnet as dried in proper sequence in the vacuum environment with pressure up to $6.0 \times 10^{-4}$ Pa prior to aging treatment; dehydrogenation temperature is 680° C.; dehydrogenation time is 1 h; diffusion treatment temperature is 850° C.; diffusion treatment time is 12 h; aging treatment temperature is 500° C.; aging treatment time is 4 h.

In this embodiment, sintered NdFeB magnet is made from massive sintered NdFeB magnet through mechanical processing (cutting); its specification (diameter×height) is Φ10×5 mm; massive sintered NdFeB magnet is prepared based on such well-established processes as strip casting, hydrogen decrepitation, jet milling, pressing and sintering in the field of NdFeB fabrication; sintered NdFeB magnet includes the following constituents: 29.5 wt. % Nd, 0.2 wt. % Dy, 1.0 wt. % B, residual Fe and other micro elements.

Embodiment 3

A method for improvement of magnetic performance of sintered NdFeB magnet includes the following steps:

① Process the dysprosium in the hydrogen gas to obtain the 1st coarse powder;

② Put the 1st coarse powder in air for deactivation for 24 h to obtain the 2nd coarse powder with hydrogen, oxygen and nitrogen content up to 5154 ppm, 7208 ppm and 1140 ppm respectively;

③ Proceed with ball milling of the 2nd coarse powder for 8 h to obtain the powder material with average particle size per specific area up to 1.49 μm;

④ Uniformly mix aforesaid powder material with ethanol absolute, and evenly spray it on the surface of sintered NdFeB magnet to form a 20 μm finish coat prior to drying at the temperature of 80° C.;

⑤ Proceed with dehydrogenation and diffusion treatment to the sintered NdFeB magnet as dried in proper sequence in the vacuum environment with pressure up to $6.0 \times 10^{-4}$ Pa prior to aging treatment; dehydrogenation temperature is 710° C.; dehydrogenation time is 2 h; diffusion treatment temperature is 900° C.; diffusion treatment time is 8 h; aging treatment temperature is 510° C.; aging treatment time is 4 h.

In this embodiment, sintered NdFeB magnet is made from massive sintered NdFeB magnet through mechanical processing (cutting); its specification (diameter×height) is Φ10×7 mm; massive sintered NdFeB magnet is prepared based on such well-established processes as strip casting, hydrogen decrepitation, jet milling, pressing and sintering in the field of NdFeB fabrication; sintered NdFeB magnet includes the following constituents: 29.5 wt. % Nd, 0.2 wt. % Dy, 1.0 wt. % B, residual Fe and other micro elements.

Embodiment 4

A method for improvement of magnetic performance of sintered NdFeB magnet includes the following steps:

① Process the Dy—Fe alloy in the hydrogen-oxygen mixed gas with oxygen content up to 0.5% to obtain the coarse powder with hydrogen and oxygen content up to 9861 ppm and 2786 ppm respectively;

② Proceed with ball milling of the coarse powder for 8 h to obtain the powder material with average particle size per specific area up to 1.58 μm;

③ Uniformly mix aforesaid powder material with ethanol absolute, and evenly spray it on the surface of sintered NdFeB magnet to form a 20 μm finish coat prior to drying at the temperature of 80° C.;

④ Proceed with dehydrogenation and diffusion treatment to the sintered NdFeB magnet as dried in proper sequence in the vacuum environment with pressure up to $6.0 \times 10^{-4}$ Pa prior to aging treatment; dehydrogenation temperature is 650° C.; dehydrogenation time is 3 h; diffusion treatment temperature is 950° C.; diffusion treatment time is 20 h; aging treatment temperature is 480° C.; aging treatment time is 4 h.

In this embodiment, sintered NdFeB magnet is made from massive sintered NdFeB magnet through mechanical processing (cutting); its specification (diameter×height) is Φ10×9 mm; massive sintered NdFeB magnet is prepared based on such well-established processes as strip casting, hydrogen decrepitation, jet milling, pressing and sintering in the field of NdFeB fabrication; sintered NdFeB magnet includes the following constituents: 29.5 wt. % Nd, 0.2 wt. % Dy, 1.0 wt. % B, residual Fe and other micro elements.

Embodiment 5

A method for improvement of magnetic performance of sintered NdFeB magnet includes the following steps:

① Process the Pr—Cu alloy in the hydrogen gas to obtain the 1st coarse powder;

② Put the 1st coarse powder in the nitrogen-oxygen mixed gas with oxygen content up to 1% for deactivation for 24 h to obtain the 2nd coarse powder with hydrogen, oxygen and nitrogen content up to 9538 ppm, 3269 ppm and 3290 ppm respectively;

③ Proceed with ball milling of the 2nd coarse powder for 8 h to obtain the powder material with average particle size per specific area up to 1.67 μm;

④ Uniformly mix aforesaid powder material with ethanol absolute, and evenly spray it on the surface of sintered NdFeB magnet to form a 20 μm finish coat prior to drying at the temperature of 80° C.;

⑤ Proceed with dehydrogenation and diffusion treatment to the sintered NdFeB magnet as dried in proper sequence in the vacuum environment with pressure up to $6.0 \times 10^{-4}$ Pa prior to aging treatment; dehydrogenation temperature is 750° C.; dehydrogenation time is 0.3 h; diffusion treatment temperature is 800° C.; diffusion treatment time is 6 h; aging treatment temperature is 500° C.; aging treatment time is 4 h.

In this embodiment, sintered NdFeB magnet is made from massive sintered NdFeB magnet through mechanical processing (cutting); its specification (diameter×height) is Φ10×3 mm; massive sintered NdFeB magnet is prepared based on such well-established processes as strip casting, hydrogen decrepitation, jet milling, pressing and sintering in the field of NdFeB fabrication; sintered NdFeB magnet includes the following constituents: 29.5 wt. % Nd, 0.2 wt. % Dy, 1.0 wt. % B, residual Fe and other micro elements.

In the sintered NdFeB magnet as obtained with methods in Embodiment 1-5, select two magnets per embodiment; mark such sintered NdFeB magnets as test sample 1-1, 1-2, 2-1, 2-1, 3-1, 3-2, 4-1, 4-2, 5-1 and 5-2 respectively; mark sintered NdFeB magnet not coated as original sample. Select B-H instrument for measurement of permanent magnet material to carry out magnetic performance test for original sample and test samples in aforesaid embodiments; test data is as shown in Table 1.

TABLE 1

Magnetic Performance of Original Samples and Test Samples in Embodiment 1-5

| Designation | Remanence (kGs) | Coercivity (kOe) | Maximum Magnetic Energy Product (MGsOe) | Squareness |
|---|---|---|---|---|
| Original sample | 13.99 | 14.88 | 46.61 | 91.9 |
| Test sample 1-1 | 13.75 | 24.12 | 45.86 | 95.5 |
| Test sample 1-2 | 13.70 | 23.88 | 45.84 | 96.3 |
| Test sample 2-1 | 13.69 | 20.10 | 45.88 | 95.2 |
| Test sample 2-2 | 13.71 | 19.93 | 45.93 | 95.0 |
| Test sample 3-1 | 13.70 | 18.51 | 44.72 | 94.3 |
| Test sample 3-2 | 13.68 | 18.31 | 44.50 | 94.2 |
| Test sample 4-1 | 13.70 | 19.22 | 45.71 | 95.5 |
| Test sample 4-2 | 13.69 | 19.31 | 45.65 | 95.6 |
| Test sample 5-1 | 13.67 | 17.10 | 44.71 | 95.4 |
| Test sample 5-2 | 13.65 | 17.08 | 44.65 | 95.3 |

Embodiment 6

A method for improvement of magnetic performance of sintered NdFeB magnet includes the following steps:

① Process the terbium metal in the hydrogen gas to obtained the coarse powder with hydrogen content up to 9590 ppm;

② Proceed with ball milling of the coarse powder for 8 h to obtain the powder material with average particle size per specific area up to 1.54 μm;

③ Uniformly mix aforesaid fine powder and terbium oxide as per the mass ratio of 9:1 to obtain the fine powder material; uniformly mix the fine powder material with ethanol absolute, and spray it on the surface of sintered NdFeB magnet to form a finish coat with thickness up to 20 μm; after that, proceed with drying treatment at the temperature of 80° C.;

④ Proceed with dehydrogenation and diffusion treatment to the sintered NdFeB magnet as dried in proper sequence in the vacuum environment with pressure up to $6.0 \times 10^{-4}$ Pa prior to aging treatment; dehydrogenation temperature is 700° C.; dehydrogenation time is 1 h; diffusion treatment temperature is 950° C.; diffusion treatment time is 10 h; aging treatment temperature is 510° C.; aging treatment time is 4 h.

In this embodiment, sintered NdFeB magnet is made from massive sintered NdFeB magnet through mechanical processing (cutting); its specification (diameter×height) is Φ10×7 mm; massive sintered NdFeB magnet is prepared based on such well-established processes as strip casting, hydrogen decrepitation, jet milling, pressing and sintering in the field of NdFeB fabrication; sintered NdFeB magnet includes the following constituents: 29.5 wt. % Nd, 0.2 wt. % Dy, 1.0 wt. % B, residual Fe and other micro elements.

Embodiment 7

A method for improvement of magnetic performance of sintered NdFeB magnet includes the following steps:

① Process the terbium metal in the hydrogen gas to obtained the $1^{st}$ coarse powder;

② Put the $1^{st}$ coarse powder in the nitrogen-oxygen mixed gas with oxygen content up to 1.5% for deactivation for 24 h to obtain the $2^{nd}$ coarse powder with hydrogen, oxygen and nitrogen content up to 9378 ppm, 3525 ppm and 3417 ppm respectively;

③ Proceed with ball milling of the $2^{nd}$ coarse powder for 8 h to obtain the powder material with average particle size per specific area up to 1.41 μm;

④ Uniformly mix aforesaid fine powder and terbium oxide as per the mass ratio of 9:1 to obtain the fine powder material; uniformly mix the fine powder material with ethanol absolute, and spray it on the surface of sintered NdFeB magnet to form a finish coat with thickness up to 20 μm; after that, proceed with drying treatment at the temperature of 80° C.;

⑤ Proceed with dehydrogenation and diffusion treatment to the sintered NdFeB magnet as dried in proper sequence in the vacuum environment with pressure up to $6.0 \times 10^{-4}$ Pa prior to aging treatment; dehydrogenation temperature is 660° C.; dehydrogenation time is 2 h; diffusion treatment temperature is 890° C.; diffusion treatment time is 18 h; aging treatment temperature is 500° C.; aging treatment time is 4 h.

In this embodiment, sintered NdFeB magnet is made from massive sintered NdFeB magnet through mechanical processing (cutting); its specification (diameter×height) is Φ10×7 mm; massive sintered NdFeB magnet is prepared based on such well-established processes as strip casting, hydrogen decrepitation, jet milling, pressing and sintering in the field of NdFeB fabrication; sintered NdFeB magnet includes the following constituents: 29.5 wt. % Nd, 0.2 wt. % Dy, 1.0 wt. % B, residual Fe and other micro elements.

Embodiment 8

A method for improvement of magnetic performance of sintered NdFeB magnet includes the following steps:

① Process the terbium metal in the hydrogen-oxygen mixed gas with oxygen content of 1% to obtain the coarse powder with hydrogen and oxygen content up to 9891 ppm and 3157 ppm respectively;

② Proceed with ball milling of the coarse powder for 8 h to obtain the powder material with average particle size per specific area up to 1.57 μm;

③ Uniformly mix aforesaid fine powder and silicon dioxide as per the mass ratio of 200:1 to obtain the fine powder material; uniformly mix the fine powder material with ethanol absolute, and spray it on the surface of sintered NdFeB magnet to form a finish coat with thickness up to 20 μm; after that, proceed with drying treatment at the temperature of 80° C.;

④ Proceed with dehydrogenation and diffusion treatment to the sintered NdFeB magnet as dried in proper sequence in the vacuum environment with pressure up to $6.0 \times 10^{-4}$ Pa prior to aging treatment; dehydrogenation temperature is 730° C.; dehydrogenation time is 0.5 h; diffusion treatment temperature is 980° C.; diffusion treatment time is 6 h; aging treatment temperature is 500° C.; aging treatment time is 4 h.

In this embodiment, sintered NdFeB magnet is made from massive sintered NdFeB magnet through mechanical processing (cutting); its specification (diameter×height) is Φ10×7 mm; massive sintered NdFeB magnet is prepared based on such well-established processes as strip casting, hydrogen decrepitation, jet milling, pressing and sintering in the field of NdFeB fabrication; sintered NdFeB magnet includes the following constituents: 29.5 wt. % Nd, 0.2 wt. % Dy, 1.0 wt. % B, residual Fe and other micro elements.

In the sintered NdFeB magnet as obtained with methods in Embodiment 6-8, select two magnets per embodiment; mark such sintered NdFeB magnets as test sample 6-1, 6-2, 7-1, 7-2, 8-1 and 8-2 respectively; mark sintered NdFeB magnet not coated as original sample. Select B-H instrument for measurement of permanent magnet material to carry out magnetic performance test for original sample and test samples in aforesaid embodiments; test data is as shown in Table 2.

TABLE 2

Magnetic Performance of Original Samples and Test Samples in Embodiment 6-8

| Designation | Remanence (kGs) | Coercivity (kOe) | Maximum Magnetic Energy Product (MGsOe) | Squareness |
|---|---|---|---|---|
| Original sample | 13.99 | 14.88 | 46.61 | 91.9 |
| Test sample 6-1 | 13.69 | 23.78 | 45.76 | 95.3 |
| Test sample 6-2 | 13.71 | 23.93 | 45.93 | 96.0 |
| Test sample 7-1 | 13.72 | 23.56 | 45.66 | 95.3 |
| Test sample 7-2 | 13.69 | 23.62 | 45.70 | 95.2 |
| Test sample 8-1 | 13.70 | 23.82 | 45.88 | 95.2 |
| Test sample 8-2 | 13.71 | 23.90 | 45.93 | 95.1 |

It can be seen from analysis of aforesaid embodiments that the sintered NdFeB magnet obtained with the method of the present invention is provided with high remanence, high coercivity, maximum magnetic energy product and excellent squareness.

Embodiment 9

A method for improvement of magnetic performance of sintered NdFeB magnet includes the following steps:
① Process the terbium metal in the hydrogen-oxygen mixed gas with oxygen content up to 1% to obtain the coarse powder; check the hydrogen content in the coarse powder at this step;
② Proceed with ball milling of the coarse powder for 8 h to obtain the powder material with average particle size per specific area up to 1.51 μm;
③ Uniformly mix aforesaid powder material with ethanol absolute, and evenly spray it on the surface of sintered NdFeB magnet to form a 20 μm finish coat prior to drying at the temperature of 80° C.;
④ Proceed with dehydrogenation to the sintered NdFeB magnet as dried in the vacuum environment with pressure up to $6.0 \times 10^{-4}$ Pa; dehydrogenation temperature is 700° C.; dehydrogenation time is 2 h; remove the magnet with finish coat under vacuum protection after dehydrogenation; check hydrogen content in the finish coat;
⑤ Proceed with diffusion and aging treatment to the sintered NdFeB magnet after dehydrogenation.

Embodiment 10

A method for improvement of magnetic performance of sintered NdFeB magnet includes the following steps:
① Process the dysprosium in the hydrogen gas to obtain the coarse powder; check hydrogen content in the coarse powder at this step;
② Deactivate the coarse powder in the nitrogen-oxygen mixed gas with oxygen content up to 1.5% for 24 h;
③ Proceed with ball milling of the coarse powder for 8 h to obtain the powder material with average particle size per specific area up to 1.48 μm;
④ Uniformly mix aforesaid powder material with ethanol absolute, and evenly spray it on the surface of sintered NdFeB magnet to form a 20 μm finish coat prior to drying at the temperature of 80° C.;
⑤ Proceed with dehydrogenation to the sintered NdFeB magnet as dried in the vacuum environment with pressure up to $6.0 \times 10^{-4}$ Pa; dehydrogenation temperature is 730° C.; dehydrogenation time is 1 h; remove the magnet with finish coat under vacuum protection after dehydrogenation; check hydrogen content in the finish coat;
⑥ Proceed with diffusion and aging treatment to the sintered NdFeB magnet after dehydrogenation.

Mark the finish coat without hydrogenation in Embodiment 9 as test sample 9-1; mark the finish coat subjecting to dehydrogenation as test sample 9-2; mark the finish coat without hydrogenation in Embodiment 10 as test sample 10-1; mark the finish coat subjecting to dehydrogenation as test sample 10-2; use hydrogen content tester for measurement; measurement data is as shown in Table 3.

TABLE 3

Hydrogen Content in Test Samples without Dehydrogenation and Test Samples Dehydrogenated

| Designation | Hydrogen Content (ppm) |
|---|---|
| Test sample 9-1 | 9851 |
| Test sample 9-2 | 54 |
| Test sample 10-1 | 9328 |
| Test sample 10-2 | 41 |

It can be seen from analysis of aforesaid Embodiment 9 and 10 that there exists high difference to hydrogen content in the finish coat before and after dehydrogenation; therefore, it is necessary to reduce the hydrogen content to a reasonable level through dehydrogenation so as to prevent adverse effect as imposed by extremely high hydrogen content on the magnetic performance of the magnet.

What is claimed is:
1. A method for improvement of magnetic performance of a sintered NdFeB magnet, comprising:

a material consisting of element R, H and X is firstly covered on a surface of the sintered NdFeB magnet to form a finish coat, and is proceeded with a diffusion treatment and an aging treatment to the sintered NdFeB magnet with the finish coat in the environment of vacuum or inert gas, wherein, R is at least one of such elements as Sc, Y, La, Ce, Pr, Nd, Pm, Sm, Eu, Gd, Tb, Dy, Ho, Er, Tm, Yb and Lu, H is hydrogen, X is at least one of such elements as C, O, N, S, B and Si, wherein in the material consisting of element R, H and X, content of the element H in terms of mass percentage is 0.5%-2%, and content of the element X in terms of mass percentage is 0.5%-10%, wherein the sintered NdFeB magnet with the finish coat shall subject to a dehydrogenation treatment prior to the diffusion treatment, and the hydrogen content in the finish coat of the sintered NdFeB magnet in terms of mass percentage is 0.001%-0.2% after the dehydrogenation treatment.

2. The method for improvement of magnetic performance of a sintered NdFeB magnet according to claim 1, wherein the element R, H and X in the material exists as the product by chemical reaction of the mixture of the element R, H and X.

3. The method for improvement of magnetic performance of a sintered NdFeB magnet according to claim 1, wherein the element R, H and X in the material exists as the product by chemical reaction of the element X and R hydride.

4. The method for improvement of magnetic performance of a sintered NdFeB magnet according to claim 1, wherein the element R is at least one of such elements as Pr, Nd, Gd, Dy, Tb and Ho.

5. The method for improvement of magnetic performance of a sintered NdFeB magnet according to claim 1, wherein minimum size of the sintered NdFeB magnet in any direction is below 15 mm before forming the finish coat.

6. The method for improvement of magnetic performance of a sintered NdFeB magnet according to claim 1, wherein a dehydrogenation temperature is 200° C.-900° C. and the holding time is 0.1 h-30 h.

7. The method for improvement of magnetic performance of a sintered NdFeB magnet according to claim 6, wherein the dehydrogenation temperature is 600° C.-800° C.

8. The method for improvement of magnetic performance of a sintered NdFeB magnet according to claim 1, wherein the diffusion treatment refers to heat preservation at the temperature of 700° C.-1000° C. for 1 h-30 h.

9. The method for improvement of magnetic performance of a sintered NdFeB magnet according to claim 1, wherein the aging treatment refers to heat preservation at the temperature of 400° C.-600° C. for 1 h-10 h.

* * * * *